US011879520B2

(12) United States Patent
Tamura et al.

(10) Patent No.: US 11,879,520 B2
(45) Date of Patent: Jan. 23, 2024

(54) FRICTION TRANSMISSION BELT, CORD FOR SAME, AND MANUFACTURING METHOD FOR SAME

(71) Applicant: Mitsuboshi Belting Ltd., Kobe (JP)

(72) Inventors: Masashi Tamura, Hyogo (JP); Takeshi Tsuji, Hyogo (JP); Takuya Tomoda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 298 days.

(21) Appl. No.: 16/770,360

(22) PCT Filed: Nov. 12, 2018

(86) PCT No.: PCT/JP2018/041878
§ 371 (c)(1),
(2) Date: Jun. 5, 2020

(87) PCT Pub. No.: WO2019/111639
PCT Pub. Date: Jun. 13, 2019

(65) Prior Publication Data
US 2020/0378469 A1 Dec. 3, 2020

(30) Foreign Application Priority Data

Dec. 7, 2017 (JP) ................................ 2017-235161
Oct. 26, 2018 (JP) ................................ 2018-201776

(51) Int. Cl.
*F16G 1/08* (2006.01)
*F16G 1/18* (2006.01)
(Continued)

(52) U.S. Cl.
CPC ................. *F16G 1/08* (2013.01); *D02G 3/36* (2013.01); *F16G 1/18* (2013.01); *F16G 5/08* (2013.01); *F16G 5/20* (2013.01); *D10B 2401/06* (2013.01)

(58) Field of Classification Search
CPC ... F16G 1/008; F16G 1/18; F16G 5/08; F16G 5/20; D02G 3/36
See application file for complete search history.

(56) References Cited

U.S. PATENT DOCUMENTS

2002/0132692 A1 9/2002 Knutson
2003/0130077 A1 7/2003 Knutson
(Continued)

FOREIGN PATENT DOCUMENTS

EP 1698720 A1 9/2006
JP S61-192943 A 8/1986
(Continued)

OTHER PUBLICATIONS

Nov. 5, 2019—(JP) Notification of Reasons for Refusal—App 2018-201776.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention pertains to a friction transmission belt that includes a core cable. The core cable includes a cord comprising: a core yarn containing high elastic-modulus fibers; and a plurality of sheath yarns that are disposed around the core yarn and that contain low elastic-modulus fibers. The cord is twisted and the proportion of the average diameter of the sheath yarn to the average diameter of the core yarn is 0.2 to 0.4.

8 Claims, 4 Drawing Sheets

(51) Int. Cl.
  *F16G 5/08* (2006.01)
  *F16G 5/20* (2006.01)
  *D02G 3/36* (2006.01)

(56) References Cited

U.S. PATENT DOCUMENTS

| | | | |
|---|---|---|---|
| 2004/0132571 A1 | 7/2004 | Knutson | |
| 2007/0098983 A1* | 5/2007 | Akiyama | D02G 3/00 428/375 |
| 2007/0144134 A1* | 6/2007 | Kajihara | D02G 3/447 57/232 |
| 2007/0232429 A1 | 10/2007 | Knox | |
| 2010/0267863 A1* | 10/2010 | Furusawa | F16G 1/08 428/394 |
| 2015/0024892 A1* | 1/2015 | Hineno | F16G 5/08 474/237 |
| 2015/0276017 A1* | 10/2015 | Okamoto | F16G 5/08 474/237 |
| 2016/0040749 A1* | 2/2016 | Kageyama | B32B 3/30 474/8 |
| 2016/0273616 A1* | 9/2016 | Takehara | F16G 1/00 |
| 2017/0030431 A1* | 2/2017 | Duke, Jr. | F16G 5/20 |
| 2017/0314641 A1* | 11/2017 | Kamba | F16G 1/28 |
| 2019/0276954 A1* | 9/2019 | Tomoda | F16G 1/28 |

FOREIGN PATENT DOCUMENTS

| | | |
|---|---|---|
| JP | H07-127689 A | 5/1995 |
| JP | H09-126278 A | 5/1997 |
| JP | 2004-535517 A | 11/2004 |
| JP | 2005-009658 A | 1/2005 |
| JP | 2016-011736 A | 1/2016 |
| NO | 2009-063952 A1 | 5/2009 |
| WO | 2004-090224 A1 | 10/2004 |
| WO | 2005-061766 A1 | 7/2005 |

OTHER PUBLICATIONS

Jan. 2, 20208—(JP) Decision of Refusal—App 2018-201776.
Feb. 1, 20192—International Search Report—Intl App PCT/JP2018/041878.
Aug. 3, 2021—(EP) Search Report—App 18884992.1.

* cited by examiner

FRICTION TRANSMISSION BELT, CORD FOR SAME, AND MANUFACTURING METHOD FOR SAME

CROSS REFERENCE TO RELATED APPLICATIONS

This is a U.S. National Phase Application under 35 U.S.C. § 371 of International Application No. PCT/JP2018/041878, filed Nov. 12, 2018, which claims priority to Japanese Application Nos. 2017-235161, filed Dec. 7, 2017 and 2018-201776, filed Oct. 26, 2018, which was published Under PCT Article 21(2), the entire contents of which are incorporated herein by reference.

TECHNICAL FIELD

The present invention relates to a frictional power-transmission belt (such as a V-ribbed belt) including a predetermined twisted cord as a core wire, a twisted cord suitable for the frictional power-transmission belt, and a method for manufacturing the frictional power-transmission belt and the cord.

BACKGROUND ART

Recently, regulations about fuel economy of automobiles have been tightened. In such a situation, more vehicles have been mounted with idling stop mechanisms as one of improvement measures of fuel economy in engines. A belt-type ISG (Integrated Starter Generator) drive for driving a crankshaft from an alternator through an accessory driving belt such as a V-ribbed belt is widely used for restarting an engine in an idling stop state. In the belt-type ISG drive, higher dynamic tension than that in a normal engine mounted with no ISG is generated in the accessory driving belt. For example, when the dynamic tension generated in an accessory driving belt in an engine mounted with no ISG is about 70 N/mm with respect to a belt width of 1 mm, a dynamic tension of about 100 N/mm is generated in an accessory driving belt in an engine mounted with a belt-type ISG drive. Therefore, an accessory driving belt for use in an engine mounted with a belt-type ISG drive is required to have a tensile elastic modulus high enough to keep the elongation of the belt small even in a case where high dynamic tension acts thereon. Conventionally, a twisted cord including a fiber having a comparatively high-elastic modulus, such as a polyester fiber or an aramid fiber, has been used as a core wire of a V-ribbed belt used for accessory drive. However, continuous increase in dynamic tension has led to insufficiency of the elastic modulus. In order to cope with high dynamic tension, it is also considered to take a measure to increase the number of ribs (increase the belt width). However, when the number of ribs is increased, the pulley width is also increased unfavorably from the viewpoint of space saving or weight reduction. That is, it is requested to provide a frictional power-transmission belt such as a V-ribbed belt which has high durability in spite of a small number of ribs owing to the enhanced tensile elastic modulus of the belt.

In order to enhance the tensile elastic modulus of a belt, it has been proposed to use a twisted cord including a carbon fiber higher in elastic modulus than an aramid fiber as a core wire. JP-A-S61-192943 (Patent Literature 1) discloses a power-transmission belt using a twisted-yarn cord of a carbon fiber as a tensile body. The literature discloses adjusting the twisted-yarn cord to have a secondary twist coefficient of 2 to 4 and applying Resorcin-Formalin-Latex (RFL) treatment thereto. The literature also discloses that a bending fatigue resistance can be improved, an elongation of the belt during running can be reduced, and a resistance to water can be improved owing to the use of the twisted-yarn cord of the carbon fiber.

As a power-transmission belt having an improved elongation resistance, JP-T-2004-535517 (Patent Literature 2) discloses a belt including a tension member of a spiral cord including a yarn including a carbon fiber having a tensile elastic modulus within a range of about 50 to 350 GPa, in which at least a part of the carbon fiber is coated with a cord treatment agent composition containing elastomer latex and a resorcinol-formaldehyde reaction product. The literature discloses a V-belt, a multi-ribbed belt and a toothed power-transmission belt as power-transmission belts by way of example. However, the literature makes a main disclosure about the toothed belt, and according to an example of the literature, the toothed power-transmission belt is manufactured using a carbon fiber cord of 396 tex.

The twisted-yarn cord of the carbon fiber exhibits a high-elastic modulus but has another aspect of a low bending fatigue resistance. That is, when the belt is bent repeatedly in use, there is a concern that the carbon fiber may be cut off and thus the strength tends to be deteriorated. To solve such a problem, WO2004/090224 (Patent Literature 3) discloses a reinforcing cord including a carbon fiber strand and a plurality of glass fiber strands disposed around the carbon fiber strand. The literature discloses that a carbon fiber strand of 400 tex is treated with RFL treatment liquid; nine twisted yarns in which glass fiber strands of 100 tex are treated with the RFL treatment liquid and then are primarily-twisted in an S-direction are disposed around the carbon fiber strand obtained thus, and secondarily-twisted in a Z-direction opposite to the aforementioned primary-twisting direction, thereby preparing a cord; and an overcoat treatment agent containing rubber is applied to the cord to prepare a reinforcing cord. It is disclosed that the reinforcing cord has tensile strength high enough to reinforce a rubber product and can enhance dimensional stability and bending fatigue resistance.

In addition, WO2009/063952 (Patent Literature 4) discloses a rubber reinforcing cord including a core fiber including a high-elastic modulus fiber and a plurality of strands including a glass fiber and disposed around the core fiber. In this cord, it is provided that a secondary twisting direction is opposite to a primary twisting direction; the number of secondary twists is 1 to 3 twists/25 mm; and a ratio of the number of primary twists to the number of secondary twists is within a range of 1.5 to 2.5. The literature describes that the core fiber of the carbon fiber and the glass fiber strands are treated with treatment liquid (containing rubber, bismaleimide and carbon black); the glass fiber strands are primarily-twisted at the number of twists of 1.7 to 4.6 twists/25 mm in an S-direction; 12 twisted yarns obtained thus are disposed around the single core fiber of the carbon fiber, and secondarily-twisted at the number of secondary twists of 1.7 twists/25 mm or 2 twists/25 mm in a Z-direction opposite to the aforementioned primary-twisting direction; and treatment liquid is applied to a surface of the reinforcing cord to form a rubber layer. It is disclosed that a high bending fatigue resistance and an excellent tensile property can be attained compatibly in the rubber reinforcing cord obtained thus.

Further, JP-A-2016-11736 (Patent Literature 5) discloses a toothed belt including core wires each including a core yarn disposed at the center thereof, and sheath yarns covering the outer circumferential surface of the core yarn entirely to fix the core yarn, in which the interval between adjacent ones of the core wires is 40% or lower of the diameter of the core wire. The literature describes that a carbon fiber strand is subjected to RFL treatment to obtain a twisted yarn, and twelve sheath yarns each including three glass fiber bundles subjected to RFL treatment and twisted together are disposed around the one core yarn of the carbon fiber obtained thus and secondarily-twisted, so as to prepare a hybrid core wire having a core-sheath structure; and the hybrid core wire is covered with an adhesive agent. In this toothed belt, it is disclosed that the bending fatigue resistance of the core wire is improved even in an environment where water or oil may adhere to the belt, and the width of the belt can be reduced.

Although the bending fatigue resistance is improved to some extent in the reinforcing cords and belts according to the aforementioned Patent Literatures 3 to 5, there is a concern that the improved bending fatigue resistance is still insufficient under recent severe use conditions in a belt-type ISG drive or the like. It is therefore requested to provide a frictional power-transmission belt capable of exhibiting high durability even when high dynamic tension act thereon, and particularly a frictional power-transmission belt which is high in power-transmission performance and has improved durability in spite of small belt width.

CITATION LIST

Patent Literature

Patent Literature 1: JP-A-561-192943 (Claim 1, [Function], and [Effects of Invention])
Patent Literature 2: JP-T-2004-535517 (Claim 1, [0001] and [0005])
Patent Literature 3: WO2004/090224 (Claim 1, lines 21-22 on page 2, and Examples)
Patent Literature 4: WO2009/063952 (Claim 1, [0012], and Examples)
Patent Literature 5: JP-A-2016-11736 (Claim 1, [0013], and Examples)

SUMMARY OF INVENTION

Technical Problem

An object of the present invention is therefore to provide a cord suitable for an application in which high dynamic tension is generated, such as an engine mounted with a belt-type ISG drive, a frictional power-transmission belt (such as a V-ribbed belt) including the cord and having excellent durability, and a method for manufacturing the cord and the frictional power-transmission belt.

Another object of the present invention is to provide a cord high in tensile elastic modulus and capable of attaining high power-transmission performance in spite of small belt width, a frictional power-transmission belt (such as a V-ribbed belt) including the cord, and a method for manufacturing the cord and the frictional power-transmission belt.

Another object of the present invention is to provide a frictional power-transmission belt (such as a V-ribbed belt) high in durability in spite of a small number of ribs, a cord suitable for the frictional power-transmission belt, and a method for manufacturing the cord and the frictional power-transmission belt.

Solution to Problem

The present inventors made intensive studies in order to attain the foregoing objects. As a result, the present inventors found that in a cord (or a core wire) including a core yarn (or a strand) including a high-elastic modulus fiber and a plurality of sheath yarns (or strands) disposed around the core yarn and including a low-elastic modulus fiber, a ratio (diameter ratio) between an average diameter of the core yarn and an average diameter of the sheath yarns, etc. have a great influence on the bending fatigue resistance of a frictional power-transmission belt and the adhesive property to a rubber composition. Thus, the present inventors completed the present invention.

That is, the frictional power-transmission belt of the present invention includes a core wire, in which the core wire includes a cord including: a core yarn (strand) including a high-elastic modulus fiber; and a plurality of sheath yarns (strands) each including a low-elastic modulus fiber and disposed around the core yarn, and the cord has a ratio (D2/D1) of an average diameter D2 of the sheath yarns to an average diameter D1 of the core yarn of 0.2 to 0.4 (that is, 0.2 or higher and 0.4 or lower). The cord includes the core yarn and the sheath yarns disposed around the core yarn, and forms a secondarily-twisted cord.

In the present invention, a total fineness and the average diameter of the sheath yarns may be typically small. The total fineness of the sheath yarns may be, for example, about 30 to 80 tex, and the average diameter of the sheath yarns may be, for example, about 0.13 to 0.25 mm. Of the core yarn and the sheath yarns, at least the sheath yarns may be twisted yarns that are twisted (primarily-twisted), and the core yarn does not have to be twisted but may be twisted at a number of twists of one or less twists/10 cm (or may be twisted at a number of twists of about 0 to 1 twists/10 cm). The cord may be also a twisted-yarn cord that is twisted (secondarily-twisted). The number of the sheath yarns per one core yarn may be, for example, about 11 to 19. The core wire may include a core wire of an S-twisted cord and a core wire of a Z-twisted cord, which are buried at a predetermined interval in a rubber layer. In addition, a secondary-twisting direction of the cord may be the same as a primary-twisting direction of the core yarn and/or the sheath yarns. Further, the high-elastic modulus fiber may include a carbon fiber, and the low-elastic modulus fiber may include a glass fiber. An adhesive component may be attached to a surface of at least a part of the high-elastic modulus fiber or a surface of at least a part of the low-elastic modulus fiber. Further, a rubber component may be attached to a surface of at least a part of the cord.

Further, the frictional power-transmission belt may be a belt (such as the V-ribbed belt) including a compression rubber layer, and staple fibers may protrude from a surface of the compression rubber layer. The frictional power-transmission belt (such as the V-ribbed belt) may have a high tensile elastic modulus, for example, a tensile elastic modulus of about 240 to 500 N/(mm·%).

The frictional power-transmission belt configured thus may be attached to a power-transmission mechanism in which high dynamic tension is generated, such as an engine mounted with a belt-type ISG drive. In such a power-transmission mechanism, a dynamic tension of 85 N/mm or more may act on per 1 mm of a width of the belt.

The frictional power-transmission belt can be manufactured in a commonly-used method using the aforementioned core wire (or the twisted cord). For example, the frictional power-transmission belt can be manufactured by a method including: forming a rubber layer or sheet (such as a laminate or a laminated sheet including an adhesion rubber layer) formed of an unvulcanized rubber composition and embedded with the core wire into a predetermined shape; and vulcanizing a formed body formed thus.

The present invention also includes the aforementioned cord and a method for manufacturing the same. The cord includes the core yarn including the high-elastic modulus fiber and the plurality of the sheath yarns each including the low-elastic modulus fiber and disposed around the core yarn, is a secondarily-twisted cord, and has the ratio of the average diameter of the sheath yarns to the average diameter of the core yarn of 0.2 to 0.4. The cord can be manufactured by a method including: disposing the plurality of the sheath yarns each including the low-elastic modulus fiber around the core yarn including the high-elastic modulus fiber; and performing a secondary-twisting, in which the ratio of the average diameter of the sheath yarns to the average diameter of the core yarn is 0.2 to 0.4. Incidentally, each of the core yarn and the sheath yarns may be subjected to a bonding treatment, and the secondarily-twisted cord may be subjected to a coating treatment with a rubber composition including a rubber component.

Although a cord buried in a rubber layer of a belt is referred to as a "core wire" in the present specification, the core wire has a form in which a core yarn is surrounded by a plurality of sheath yarns, in the same manner as the cord. Therefore, the core wire may be used as a synonym of the cord. A numerical range "XX to YY" means that the range includes the numerical value "XX" and the numerical value "YY", that is, means that it is the numerical value "XX" or more and the numerical value "YY" or less.

Advantageous Effects of Invention

In the present invention, the ratio of the average diameter of the sheath yarns of the low-elastic modulus fiber to the average diameter of the core yarn of the high-elastic modulus fiber is so small that power can be transmitted effectively with a narrow belt width and the durability can be improved largely even in an application (power-transmission mechanism) in which high dynamic tension is generated, such as an engine mounted with a belt-type ISG drive. In addition, the tensile elastic modulus is also so high that the durability can be improved even in a frictional power-transmission belt (such as a V-ribbed belt) with a small number of ribs.

DESCRIPTION OF EMBODIMENTS

An example of a frictional power-transmission belt according to the present invention will be described below. (Twisted Cord or Bundled Yarn, and Method for Manufacturing the Same)

Figure 1:
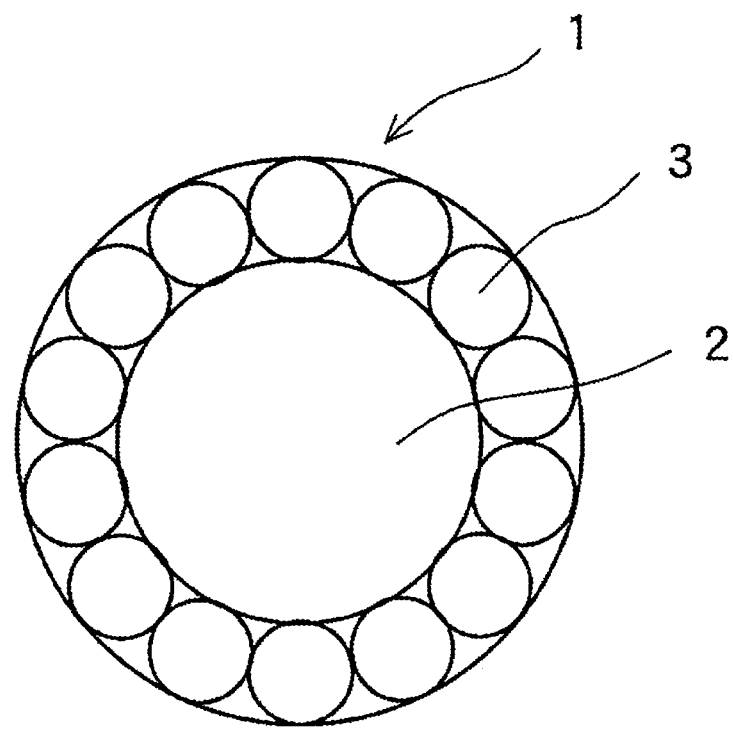
FIG. 1 is a schematic sectional view showing a form of a core wire (or a twisted cord).

A core wire (or twisted cord) that can be used suitably in a frictional power-transmission belt according to the present invention includes a core yarn including a high-elastic modulus fiber and sheath yarns including a low-elastic modulus fiber, and has a form as a twisted cord. For example, as shown in FIG. 1, the core wire (or twisted cord) 1 has a form in which a plurality of sheath yarns 3 are disposed around a core yarn 2 and twisted (secondarily-twisted) to be bundled so that the core yarn 2 is surrounded by the plurality of sheath yarns 3 (a form in which a core portion of the cord 1 is formed of the core yarn 2 and a sheath portion of the cord 1 is formed of the sheath yarns 3). The high-elastic modulus fiber included in the core yarn is mainly effective in improving the resistance to a tensile load. Therefore a transmission can be attained in spite of a narrow width of a belt and elongation of the belt can be kept small even if high dynamic tension is generated. The low-elastic modulus fiber included in the sheath yarns is mainly effective in improving the adhesive property and relaxing the shearing stress so that interfacial peeling between a rubber composition and the core wire can be inhibited to improve the life of the belt.

In the present invention, the ratio in average diameter between the core yarn and the sheath yarns is important in order to make full use of the functions of the core yarn and the sheath yarns. When the average diameter of the sheath yarns is reduced to reduce a ratio (D2/D1) of an average diameter D2 of the sheath yarns to an average diameter D1 of the core yarn, the functions of the core yarn and the sheath yarns can be effectively exhibited. The ratio (D2/D1) of the average diameter D2 of the sheath yarns to the average diameter D1 of the core yarn is 0.2 to 0.4 (for example, 0.23 to 0.39). The ratio (D2/D1) may be preferably about 0.25 to 0.38 (for example, 0.30 to 0.37) and more preferably about 0.32 to 0.37 (for example, 0.34 to 0.37), or may be about 0.28 to 0.38 (for example, 0.32 to 0.36). When the core yarn and the sheath yarns are used at such an average diameter ratio (D2/D1), the bending fatigue resistance and the adhesive property to the rubber composition can be attained compatibly at a high level. When a stress acts on the belt, a shearing stress is concentrated between the rubber which is easily deformed and the core wire which is hardly deformed. Thus, peeling tends to occur. However, since the sheath yarns low in elastic modulus are located in an outer circumferential portion of the core wire, the core wire can be deformed more easily than a case of the core yarn used alone and the concentration of the shearing stress can be relaxed. When the aforementioned ratio (D2/D1) is less than 0.2, the adhesive property becomes so low that interlayer peeling tends to occur between the core wire and the rubber composition and the durability of the belt deteriorates. When the aforementioned ratio (D2/D1) exceeds 0.4, the bending fatigue is accelerated due to increase in bending strain and the durability deteriorates.

The average diameters D1 and D2 of the core yarn and the sheath yarns can be obtained as follows. In a microscopic photograph of a section of the core yarn and sheath yarns or a section of the belt in the width direction, 30 yarns are selected at random for each of the core yarn and the sheath yarns. The major diameter and the minor diameter of each yarn are measured, and an arithmetic mean diameter thereof is calculated. A total value of mean diameters calculated thus is divided by 30 and thus averaged.

(Core Yarn)

The high-elastic modulus fiber of the core yarn may be an inorganic or organic fiber with a high tensile elastic modulus. The tensile elastic modulus of the high-elastic modulus fiber may be, for example, about 200 to 900 GPa (for example, 200 to 800 GPa), preferably about 210 to 500 GPa (for example, 220 to 300 GPa), and more preferably about 220 to 270 GPa (for example, 220 to 250 GPa). The tensile elastic modulus of a fiber can be measured in a method in which a load-elongation curve is measured by a method according to JIS L 1013 (2010) and an average inclination in a region where a load is 1,000 MPa or less is obtained (the same method can be applied hereinafter). Since the core yarn includes the high-elastic modulus fiber, the tensile elastic modulus of the belt can be improved so that power transmission can be achieved with a narrow belt width even in an application where high dynamic tension is generated. When the tensile elastic modulus of the fiber is too low, there is a concern that the belt elongation may increase to increase slippage, causing failure in power transmission, occurrence of abnormal sound, and deterioration in durability due to heat generation. On the contrary, when the tensile elastic modulus of the fiber is too high, there is a concern that fluctuation of tension in the belt may increase to lower the durability.

Examples of such high-elastic modulus fibers include a carbon fiber, and a PBO (poly-para-phenylene benzobisoxazole) fiber. Each of those fibers may be used alone or two or more kinds of them may be used in combination. Since carbon fiber has a particularly high-elastic modulus, the carbon fiber is preferred as the high-elastic modulus fiber. When the carbon fiber is used, durability can be improved with a smaller belt width even in an application where high dynamic tension is generated.

Examples of the carbon fiber (carbon fiber) as a raw yarn include a pitch-based carbon fiber, a polyacrylonitrile (PAN)-based carbon fiber, a phenolic resin-based carbon fiber, a cellulose-based carbon fiber, and a polyvinyl alcohol-based carbon fiber. As commercial products of the carbon fibers, for example, "TORAYCA (registered trademark)" manufactured by Toray Industries, Inc., "TENAX (registered trademark)" manufactured by Toho Tenax Co., Ltd., "DIALEAD (registered trademark)" manufactured by Mitsubishi Chemical Corporation, etc. can be used. Each of those carbon fibers may be used alone, or two or more kinds of them may be used in combination. Of those carbon fibers, the pitch-based carbon fiber and the PAN-based carbon fiber are preferred, and the PAN-based carbon fiber is particularly preferred.

The carbon fiber as a raw yarn is typically a carbon multifilament yarn including the carbon fiber. Any carbon multifilament yarn can be used as long as it includes monofilament yarns of the carbon fiber. If necessary, the carbon multifilament yarn may include monofilament yarns of fibers (an inorganic fiber such as a glass fiber, an organic fiber such as an aramid fiber, etc.) other than the carbon fiber. The ratio of the carbon fiber may be 50 mass % or higher (50 to 100 mass %) in the total of the monofilament yarns (multifilament yarn). The ratio of the carbon fiber is preferably 80 mass % or higher, more preferably 90 mass % or higher, and typically 100 mass %, namely all the monofilament yarns are typically made of the carbon fiber. When the ratio of the carbon fiber is too low, there is a concern that the elongation of the belt may increases so that the durability may deteriorate if high dynamic tension is generated.

Any multifilament yarn can be used as long as it includes a plurality of monofilament yarns. For example, the multifilament yarn may include about 100 to 50,000 monofilament yarns, preferably about 1,000 to 30,000 monofilament yarns, and more preferably about 5,000 to 20,000 (particularly 10,000 to 15,000) monofilament yarns. The average fineness of the monofilament yarns may be, for example, about 0.1 to 5 dtex, preferably about 0.3 to 3 dtex, and more preferably about 0.5 to 1 dtex.

The total fineness of the core yarn can be selected from a range where a desired core wire diameter can be obtained. For example, the total fineness of the core yarn may be about 100 to 1,000 tex (for example, 120 to 800 tex), preferably about 150 to 700 tex (for example, 200 to 600 tex), and more preferably about 250 to 500 tex (for example, 300 to 450 tex), or may be about 300 to 600 tex (for example 350 to 550 tex). When the total fineness of the core yarn is adjusted within such a range, the core wire diameter can be controlled within a proper range so that the tensile elastic modulus of the belt can be enhanced satisfactorily. When the total fineness is too small, there is a concern that the core wire diameter becomes too small so that the tensile elastic modulus and the tensile strength of the belt may be lowered. When the total fineness is too large, there is a concern that the core wire diameter becomes too large so that the bending fatigue resistance may be lowered.

The average diameter (average wire diameter) of the core yarn may be, for example, about 0.2 to 1 mm (for example, 0.25 to 0.95 mm), preferably about 0.3 to 0.8 mm (for example, 0.35 to 0.75 mm), and more preferably about 0.4 to 0.7 mm (for example, 0.4 to 0.65 mm), or may be about 0.35 to 0.65 mm (for example, 0.37 to 0.63 mm). When the wire diameter of the core yarn is too small, there is a concern that the tensile elastic modulus of the belt may be lowered. When the wire diameter of the core yarn is too large, there is a concern that the bending fatigue resistance in the belt may be lowered.

The core yarn which has not been bundled (secondarily-twisted) yet may be a twisted yarn or may be a fiber bundle of a twistless yarn. In order to enhance the tensile elastic modulus and use the belt suitably even in an application where high dynamic tension is generated, the core yarn is a fiber bundle of a twistless yarn or a twisted yarn twisted at a number of twists of 1 or less twists/10 cm (or a twistless yarn or a twisted yarn twisted at a number of twists of 0 to 1 twists/10 cm). The fiber bundle of a twistless yarn is preferred. Incidentally, examples of the twistless yarn include a substantially twistless yarn or fiber bundle twisted at a number of twists of 0.1 or less twists/10 cm. The core yarn which is twistless or twisted at a reduced number of twists can keep the elongation of the belt low so that the belt can be used suitably for an application where high dynamic tension is generated. When the number of twists in the core yarn increases, the elongation of the belt increases so that the belt cannot be easily used for an application where high dynamic tension is generated.

(Sheath Yarn)

The low-elastic modulus fiber forming the sheath yarns may be a fiber with a low tensile elastic modulus, for example, a fiber with a tensile elastic modulus of about 50 to 150 GPa (for example 55 to 120 GPa), and preferably about 60 to 100 GPa (for example, 60 to 80 GPa). When the sheath yarns of the low-elastic modulus fiber are disposed around the core yarn, the bending fatigue resistance, the adhesive property to the rubber composition and the effect of relaxing the shearing stress can be enhanced to improve the durability of the belt.

Examples of the low-elastic modulus fiber include a glass fiber, and an organic fiber (such as an aramid fiber, a polyester fiber, a nylon fiber or a cellulose fiber). Each of those fibers may be used alone or two or more kinds of them may be used in combination. The glass fiber is preferred as the low-elastic modulus fiber in terms of balance among the adhesive property, the tensile strength, the elastic modulus and the cost. The glass fiber is comparatively high in adhesive property to the rubber composition. Therefore, the effect of improving the durability of the belt is high. In addition, the elastic modulus is also comparatively high. Therefore, the elastic modulus of the belt can be improved.

Examples of the glass fiber as a raw yarn include non-alkali glass (E-glass), and high-strength glass (K-, U- or S-glass) rich in silicon Si component. Examples of commercial products of the glass fiber include a K-glass fiber and a U-glass fiber (both manufactured by Nippon Sheet Glass Co., Ltd.), a T-glass fiber (manufactured by Nitto Bosch Co., Ltd.), an R-glass fiber (manufactured by Vetrotex), an S-glass fiber, an S-2-glass fiber and a ZENTRON glass fiber (all manufactured by Owens Corning Fiberglass). Of those glass fibers, the high-strength glass (K-glass fiber) is the most preferred because it can enhance the tensile strength and the elastic modulus of the twisted cord. In addition, in terms of adhesive property, the glass fiber may be subjected to a surface treatment with a silane coupling agent.

The glass fiber as a raw yarn is typically a glass multifilament yarn including the glass fiber. Any glass multifilament yarn can be used as long as it includes monofilament yarns of the glass fiber. If necessary, the glass multifilament yarn may include monofilament yarns of fibers (an inorganic fiber such as a carbon fiber, an organic fiber such as an aramid fiber, etc.) other than the glass fiber. The ratio of the glass fiber may be 50 mass % or higher (50 to 100 mass %) in the total of the monofilament yarns (multifilament yarns). The ratio of the glass fiber is preferably 80 mass % or higher, more preferably 90 mass % or higher, and typically 100 mass %, namely all the monofilament yarns are typically made of the glass fiber. When the ratio of the glass fiber is too low, there is a concern that the adhesive property and the effect of relaxing the shearing stress may be lowered so that the durability of the belt may deteriorate.

Any sheath yarn (such as a glass multifilament yarn) can be used as long as it includes a plurality of monofilament yarns. The average diameter (diameter) of the monofilaments forming the sheath yarn is not particularly limited, but it is typically about 6 to 9 μm. The total fineness of the sheath yarn (such as a glass multifilament yarn) can be selected from a range where the bending fatigue resistance and the adhesive property can be attained compatibly. For example, the total fineness may be about 20 to 100 tex (for example, 25 to 90 tex), preferably about 30 to 80 tex (for example, 30 to 75 tex), and more preferably about 35 to 70 tex (for example, 50 to 70 tex). When sheath yarns having such a total fineness are used, the bending fatigue resistance and the adhesive property to the rubber component can be attained compatibly at a high level. When the total fineness of the sheath yarns is too small, there is a concern that the adhesive property deteriorates so that interlayer peeling between the core wire and the rubber composition may occur easily, and the effect of relaxing the shearing stress deteriorates so that the durability of the belt may be lowered. When the total fineness of the sheath yarns is too large, the bending fatigue is accelerated due to increase in bending strain and thus the durability of the belt deteriorates.

The average diameter of the sheath yarns may be, for example, about 0.13 to 0.25 mm (for example, 0.14 to 0.24 mm), preferably about 0.15 to 0.23 mm (for example, 0.15 to 0.22 mm), and more preferably about 0.19 to 0.22 mm, or may be about 0.17 to 0.24 mm (for example, 0.18 to 0.23 mm). When sheath yarns having such an average diameter are used, the bending fatigue resistance and the adhesive property to the rubber component can be attained compatibly at a high level in the same manner as in the case of the aforementioned fineness.

The sheath yarns may be twistless yarns (twistless fiber bundles). However, in order to enhance the bending fatigue resistance and the effect of relaxing the shearing stress, it is preferable that, of the core yarn and the sheath yarns, at least the sheath yarns are twisted yarns which are primarily-twisted. That is, the sheath yarns positioned in the outer circumferential portion of the cord receive a larger strained stress than the core yarn positioned in the central portion of the cord when the cord is bent. Therefore, when each sheath yarn is primarily-twisted independently in addition to the twisting (secondary twisting) of the cord as a whole, the strained stress during the bending can be absorbed. Thus, the bending fatigue resistance and the effect of relaxing the shearing stress can be improved. The number of primary twists in the sheath yarn can be selected suitably from a range where the aforementioned effects can be exhibited satisfactorily. Typically the number of primary twists may be about 3 to 15 twists/10 cm (for example, 5 to 15 twists/10 cm), and preferably about 5 to 12 twists/10 cm (for example, 6 to 10 twists/10 cm).

(Bonding Treatment)

It is preferable that a bonding treatment is performed on each of the core yarn (high-elastic modulus fiber) and the sheath yarns (low-elastic modulus fiber) before secondary twisting so as to attach (or coat) an adhesive component to a surface of at least a part (preferably almost entire) of the core yarn (high-elastic modulus fiber) and the sheath yarns (low-elastic modulus fiber). However, the bonding treatment does not have to be always performed. The adhesive component may be attached to a surface of at least a part of the high-elastic modulus fiber and/or the low-elastic modulus fiber, that is, a surface of at least a part of the core yarn and/or the sheath yarns. For example, the adhesive component may be attached to almost entire of the high-elastic modulus fiber and the low-elastic modulus fiber or almost entire of the core yarn and the sheath yarns. When the bonding treatment is performed, the converging property between fibers in the core yarn and the sheath yarns is improved so that the core wire exposed from a width cut section of the belt can be inhibited from fraying and thus the durability can be improved. In addition, when the core yarn and the sheath yarns are treated with the same adhesive agent, the core yarn and the sheath yarns can be integrated when the belt is vulcanized and thus the effect of relaxing the shearing stress can be enhanced.

A method used commonly can be used for the bonding treatment. For example, the bonding treatment can be performed by performing a treatment (such as immersion treatment) with Resorcin-Formalin-Latex (RFL) treatment liquid or treatment liquid containing a polyisocyanate compound, and then drying the liquid. The RFL treatment liquid may be, for example, a latex-based adhesive agent containing resorcin-formalin resin, a bismaleimide compound, a polyisocyanate compound, etc. In addition, latex rubber may be rubber having a functional group such as a carboxyl group, for example, nitrile rubber or hydrogenated nitrile rubber having a carboxyl group.

(Form of Core Wire (or Twisted Cord or Bundled Yarn))

The twisted cord forming the core wire has a form in which a plurality of sheath yarns are disposed around a core yarn and secondarily-twisted. The number of the sheath yarns disposed around the core yarn can be selected from a range of about 10 to 20 per one core yarn. In order to make the bending fatigue resistance and the adhesive property to the rubber composition compatible at a high level, the number of the sheath yarns per one core yarn may be about 11 to 19 (for example, 12 to 19) and preferably about 13 to 18 (for example, 14 to 16), or may be about 12 to 18 (for example, 13 to 17). When the number of the sheath yarns is too small, the adhesive property deteriorates so that interlayer peeling may occur easily between the core wire and the rubber composition. Thus, the durability of the belt deteriorates. When the number of the sheath yarns is too large, the sheath yarns ride on one another to distort the shape of the core wire, and the bending fatigue is accelerated due to increase in bending strain. Thus, the durability deteriorates.

The twisted cord (or secondarily-twisted cord) forming the core wire may be a single-twist in which a twistless fiber bundle of the core yarn and twistless fiber bundles of the sheath yarns disposed around the core yarn are twisted in one direction. Alternatively, the twisted cord may be a Lang's lay in which primarily-twisted yarns are used as the core yarn and/or the sheath yarns (particularly, at least the twisted yarns as the sheath yarns), and the sheath yarns are disposed around the core yarn and secondarily-twisted in the same direction as a direction of the primary twisting; an organzine in which secondary twisting is performed in an opposite direction to a direction of primary twisting; or a cord which is subjected to intermediate twisting in addition to primary twisting and secondary twisting. A preferred core wire (twisted cord) is a twisted cord which is secondarily-twisted in the same direction as or an opposite direction to a direction of primary twisting, particularly a twisted cord which is secondarily-twisted in the same direction as a direction of primary twisting. In the twisted cord which is secondarily-twisted in the same direction as the direction of primary twisting, the bending fatigue resistance is improved in comparison with the twisted cord in which the direction of secondary twisting is opposite to the direction of primary twisting.

The number of secondary twists in the core wire (or secondarily-twisted cord) can be, for example, selected from a range of about 3 to 15 twists/10 cm. The number of secondary twists may be typically about 5 to 15 twists/10 cm (for example, 5 to 14 twists/10 cm), and more preferably about 6 to 12 twists/10 cm (for example, 6 to 10 twists/10 cm). In the core wire (or twisted cord) twisted at such a number of twists, elongation can be reduced while keeping the bending fatigue resistance. When the number of twists in the core wire (or twisted cord) is increased, the effect of relaxing to the shearing stress can be enhanced to improve the bending fatigue resistance. When the number of twists in the core wire (or twisted cord) is too small, there is a concern that the bending fatigue resistance deteriorates to lower the durability of the belt. When the number of twists in the core wire (or twisted cord) is too large, the bending fatigue resistance is indeed excellent, but there is a concern that elongation is increased while the tensile elastic modulus and the tensile strength are lowered.

The average diameter (average wire diameter or core wire diameter) of the core wire (or secondarily-twisted cord) may be, for example, about 0.3 to 1.5 mm (for example, 0.4 to 1.4 mm), preferably about 0.5 to 1.3 mm (for example, 0.6 to 1.2 mm), and more preferably about 0.7 to 1.2 mm (for example, 0.75 to 1.2 mm), or may be about 0.65 to 1.25 mm (for example, 0.75 to 1.15 mm). When the core wire diameter (or twisted cord diameter) is too small, there is a concern that the tensile elastic modulus of the belt is lowered. When the core wire diameter (or twisted cord diameter) is too large, there is a concern that the bending fatigue resistance of the belt deteriorates.

(Coating Treatment)

As described above, the adhesive property between the fibers, between the core yarn and the sheath yarns, and between the core wire and the rubber can be improved by the bonding treatment on the core yarn and/or the sheath yarns. Accordingly, it is not always necessary to perform a bonding treatment on the cord (twisted cord). However, it is preferable that a rubber component (such as a rubber component of an adhesion rubber layer which will be described later) is attached to (or coated on) a surface of at least a part (preferably almost entire) of the twisted cord in which the sheath yarns and the core yarn are secondarily-twisted together. The attachment (or coating) of the rubber component can be performed by a coating (or overcoat) treatment on the cord using a rubber composition containing the rubber component (such as rubber cement in which the rubber component is dissolved in a solvent such as toluene). For example, the coating treatment may be performed by immersing the twisted cord in a rubber-containing composition (rubber cement), then drying the composition, and performing a heat treatment thereon. In the twisted cord subjected to such a coating treatment, the adhesive property to the rubber can be further enhanced in comparison with a core wire in which only the bonding treatment is applied to the core yarn and/or the sheath yarns, and thus the effect of relaxing to the shearing stress can be enhanced, and the durability of the belt can be improved.

(Frictional Power-Transmission Belt)

According to the present invention, a high tensile elastic modulus, bending fatigue resistance, and durability can be attained. Therefore, the present invention is suitably applied to a frictional power-transmission belt such as a flat belt, or a V-belt (such as a wrapped V-belt, a raw edge V-belt, a raw edge cogged V-belt, or a V-ribbed belt (particularly the V-ribbed belt)). Particularly, in an application where high dynamic tension is generated, the V-ribbed belt is preferred. Although a V-belt, a multi-ribbed belt and a toothed power-transmission belt are exemplified as power-transmission belts in the aforementioned Patent Literature 2, there is no specific consideration about a V-ribbed belt. In addition, a power-transmission mechanism in the toothed power-transmission belt considered specifically is greatly different from that of the V-ribbed belt. Therefore, there is a difference in applications, problems and a required strength level between the toothed belt and the frictional power-transmission belt (such as the V-ribbed belt), and thus the configuration of the toothed belt is not so informative for the frictional power-transmission belt.

Any frictional power-transmission belt such as the V-ribbed belt can be used as long as it includes the aforementioned core wire (or twisted cord). Typically a plurality of such cords are buried in a rubber layer (such as an adhesion rubber layer) of the frictional power-transmission belt. The cords are disposed to extend in the longitudinal direction of the belt, and to be separated from one another at a predetermined pitch in the width direction of the belt.

(Core Wire Pitch)

It is preferable that the core wire pitch (the distance between centers of two cords adjacent to each other in the belt) is smaller because the tensile strength and the tensile elastic modulus of the belt can be enhanced. However, when the core wire pitch is too small, there is a concern that adjacent ones of the core wires tend to partially overlap (ride on) each other and rubber less apt to flow between the core wires to thereby reduce the adhesive force. In addition, there is a concern that the core wires may contact and rub each other when the belt is bent, thereby deteriorating the bending fatigue resistance. Therefore, it is desirable that the core wire pitch is a little larger than the core wire diameter.

The core wire pitch can be selected from a range about 0.01 to 1 mm larger than the core wire diameter. The core wire pitch may be about 0.05 to 0.8 mm (for example, 0.1 to 0.5 mm) larger than the core wire diameter, and more preferably about 0.2 to 0.4 mm (particularly 0.2 to 0.3 mm) larger than the core wire diameter. Specifically, the core wire pitch may be, for example, about 0.5 to 2 mm (for example, 0.6 to 1.8 mm), preferably about 0.7 to 1.7 mm (for example, 0.8 to 1.6 mm), more preferably about 0.8 to 1.5 mm (for example, 0.9 to 1.4 mm), and particularly about 0.85 to 1.5 mm (for example, 0.9 to 1.35 mm). When the core wire pitch is too small, there may arise a problem that each core wire rubs on another core wire to deteriorate the belt strength when the belt is bent, and each core wire rides on another core wire when the belt is manufactured. When the core wire pitch is too large, there is a concern that the tensile elastic modulus of the belt may be reduced even when a fiber high in tensile elastic modulus (such as a carbon fiber) is used.

Incidentally, as for the core wires, core wires of cords secondarily-twisted in the same direction (for example, S-twisted cords secondarily-twisted in an S-direction or Z-twisted cords secondarily-twisted in a Z-direction) may be buried at a predetermined interval (or at a predetermined pitch), or core wires of S-twisted cords and core wires of Z-twisted cords may be combined and buried. For example, core wires of S-twisted cords and core wires of Z-twisted cords may be buried regularly at every predetermined interval (for example, at every equal interval) or buried irregularly. Typically they may be buried regularly, for example, alternately. When core wires of S-twisted cords and core wires of Z-twisted cords are buried, the straightness of the belt can be enhanced. That is, when only the core wires of the S-twisted cords or only the core wires of the Z-twisted cords are buried as the core wires, the property of the belt leaning to one side of either left or right with respect to the running direction is intensified due to the untwisting torque of the core wires. When the inclined running occurs, abrasion in a frictional power-transmission face or a belt end face is accelerated, thereby reducing the durability. On the other hand, when the core wires of the S-twisted cords and the core wires of the Z-twisted cords are buried (particularly buried to be disposed alternately), the untwisting torques of the core wires cancel each other to thereby enhance the straightness of the belt. Thus, the durability can be improved.

The details of the aforementioned frictional power-transmission belt will be described below along a V-ribbed belt by way of example.

(V-Ribbed Belt)

Figure 2:
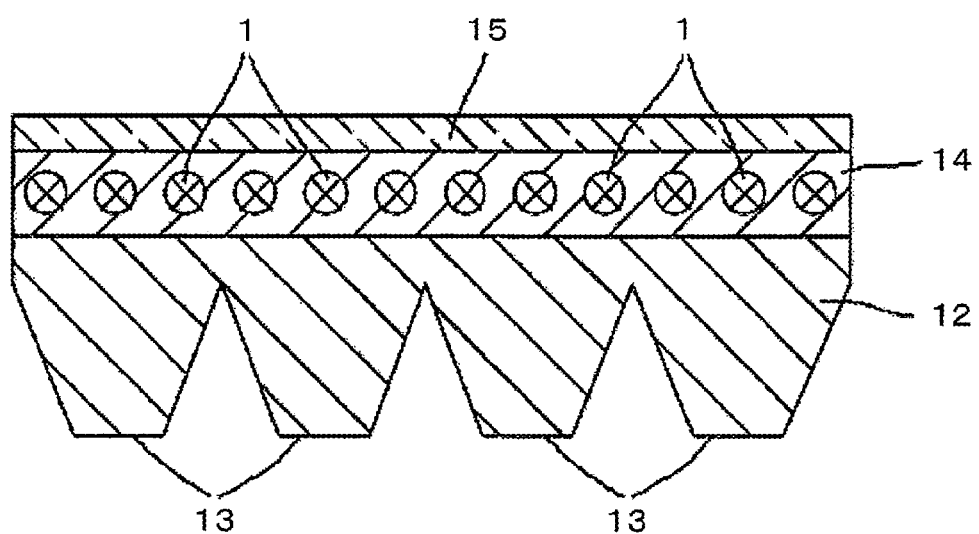
FIG. 2 is a schematic sectional view showing an example of a V-ribbed belt as a frictional power-transmission belt.

The form of the V-ribbed belt is not particularly limited as long as it includes a plurality of V-rib portions extending in parallel with one another along the longitudinal direction of the belt. An example of the form is shown in FIG. 2. FIG. 2 is a schematic sectional view showing an example of the V-ribbed belt of the present invention. The V-ribbed belt shown in FIG. 2 has a form in which a compression rubber layer 12, an adhesion rubber layer 14 having core wires (or twisted cords) 1 buried in the longitudinal direction of the belt, and a tension layer 15 formed of a cover fabric (woven fabric, knitted fabric, nonwoven fabric, etc.) or a rubber composition are disposed sequentially from the belt bottom (inner circumferential surface) toward the belt top (back surface). A plurality of grooves with V-shaped section extending in the longitudinal direction of the belt are formed in the compression rubber layer 12. A plurality of V-rib portions 13 (four in the example shown in FIG. 2) each having a V-shape (inverted trapezoidal shape) in section are formed between the grooves. Two slopes (surfaces) of each V-rib portion 13 form friction power-transmission faces, which contact with a pulley to transmit (frictionally transmit) power. Inside the adhesion rubber layer 14, a plurality of core wires (or twisted cords) 1 are disposed to extend in the longitudinal direction of the belt and to be separated from one another at a predetermined pitch in the width direction of the belt.

The form of the V-ribbed belt is not limited to the form shown in FIG. 2. Any V-ribbed belt can be used as long as it includes a compression rubber layer having a power-transmission face at least a part of which can contact a V-rib groove portion (V-groove portion) of a pulley. Typically the V-ribbed belt has a tension layer, a compression rubber layer, and core wires (or twisted cords) buried therebetween along the longitudinal direction of the belt. In the V-ribbed belt of the present invention, for example, the core wires (or twisted cords) 1 may be buried between the tension layer 15 and the compression rubber layer 12 without providing the adhesion rubber layer 14. Further, the V-ribbed belt may have a form in which the adhesion rubber layer 14 is provided to either the compression rubber layer 12 or the tension layer 15, and the core wires (or twisted cords) 1 are buried between the adhesion rubber layer 14 (the compression rubber layer 12 side) and the tension layer 15 or between the adhesion rubber layer 14 (the tension layer 15 side) and the compression rubber layer 12.

Any compression rubber layer 12 can be used as long as it includes a rubber composition which will be described below in detail, any adhesion rubber layer 14 can be used as long as it includes a rubber composition which is commonly used as an adhesion rubber layer, and any tension layer 15 can be used as long as it includes a cover fabric or a rubber composition which is commonly used as a tension layer. The tension layer 15 does not have to include the same rubber composition as the compression rubber layer 12.

In the V-ribbed belt, the number of V-ribs (rib number) is four in FIG. 2, and may be selected from a range of about 2 to 6. The present invention is greatly characterized in that the durability of the belt can be improved in spite of a small number of ribs. The number of ribs may be 3 to 5, and preferably 4. According to the present invention, when the number of ribs is set to be as small as about 3 to 5, a request to save the space and reduce the weight can be satisfied. When the number of ribs is too small, there is a concern that the tensile elastic modulus and the tensile strength may be insufficient even if a carbon fiber is used. On the contrary, when the number of ribs is too large, there is a concern that the request to save the space and reduce the weight may not be sufficiently satisfied.

The V-ribbed belt is suitable for an application where high dynamic tension is generated. For example, in an engine mounted with a belt-type ISG drive, high dynamic tension acts on the belt at the start of the engine, and such start is often repeated. Therefore, the V-ribbed belt is required to have higher tensile strength than a usual belt. In such an application, the tensile strength of the V-ribbed belt may be 420 N/mm or more (for example, 420 to 1,000 N/mm) as a value per 1 mm width of the belt. The tensile strength may be preferably 560 N/mm or more, and more preferably 620 N/mm or more (particularly 680 N/mm or more). In an application where especially high dynamic tension is generated, the tensile strength may be preferably 750 to 1,000 N/mm (particularly 800 to 900 N/mm). When the tensile strength of the belt is adjusted within such a range, the belt can show enough durability not to be cut off even if high dynamic tension acts on the belt.

The frictional power-transmission belt (particularly the V-ribbed belt) of the present invention has a high tensile elastic modulus. The tensile elastic modulus may be, for example, about 240 to 500 N/(mm·%) (for example, 270 to 490 N/(mm·%)), preferably about 300 to 480 N/(mm·%) (for example, 350 to 480 N/(mm·%)), and more preferably about 400 to 470 N/(mm·%) (for example, 420 to 450 N/(mm·%)). When the tensile elastic modulus of the belt is small, there is a concern that the elongation of the belt may increase to increase slippage, causing failure in power transmission, occurrence of abnormal noise, and deterioration in durability due to heat generation. When the tensile elastic modulus of the belt is too large, there is a concern that the fluctuation of the tension in the belt may increase to deteriorate the durability.

Incidentally, in the present description and claims, the tensile strength and the tensile elastic modulus of the V-ribbed belt can be measured by a method described in Examples which will be described later.

The engine mounted with a belt-type ISG drive to which the frictional power-transmission belt (particularly the V-ribbed belt) is suitably applied (mounted) may be, for example, an engine in which dynamic tension per 1 mm width of the belt of 85 N/mm or more (for example, about 90 to 120 N/mm) is generated. Under such severe conditions, the frictional power-transmission belt (particularly the V-ribbed belt) of the present invention can show its own advantageous effect more effectively. Incidentally, the engine mounted with a belt-type ISG drive may be an engine mounted with a belt-type ISG drive including a tensioner at the back surface of the belt.

The frictional power-transmission belt of the present invention has high durability and excellent power-transmission performance in spite of the small width of the belt. Therefore, the width of the belt is not particularly limited. For example, the width of the belt may be about 0.5 to 5 cm (for example, 0.7 to 4 cm), and preferably about 0.8 to 3 cm (for example, 1 to 2 cm).

(Rubber Composition)

The compression rubber layer 12, the adhesion rubber layer 14 and the tension layer 15 can be formed of rubber compositions containing rubber components. Particularly when the compression rubber layer 12 is formed of a rubber composition, excellent calmness and power-transmission performance can be provided. Further, when the compression rubber layer 12 and the adhesion rubber layer 14 are formed of a rubber composition, the bonding treatment with the core wires (or twisted cords) 1 can be performed by use of an existing method.

Vulcanizable or crosslinkable rubber may be used as a rubber component. Examples of such rubber components include diene-based rubber (natural rubber, isoprene rubber, butadiene rubber, chloroprene rubber, styrene-butadiene rubber (SBR), acrylonitrile-butadiene rubber (nitrile rubber), hydrogenated nitrile rubber, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. Each of those rubber components may be used alone, or two or more kinds of them may be used in combination. The ethylene-α-olefin elastomer (ethylene-propylene copolymer (EPM), ethylene-propylene-diene terpolymer (EPDM), etc.) and the chloroprene rubber are preferred rubber components. Further, the ethylene-α-olefin elastomer (ethylene-propylene copolymer (EPM), ethylene-propylene-diene terpolymer (EPDM), etc.) is particularly preferred because it does not contain harmful halogens but has ozone resistance, heat resistance, cold resistance and weather resistance and the weight of the belt can be reduced. In the composition in which the rubber component includes the ethylene-α-olefin elastomer, the ratio of the ethylene-α-olefin elastomer in the rubber component may be 50 mass % or higher (particularly about 80 to 100 mass %), and preferably 100 mass % (only the ethylene-α-olefin elastomer).

The rubber composition may further include a staple fiber. Examples of such staple fibers include a synthetic fiber such as a polyolefin-based fiber (a polyethylene fiber, a polypropylene fiber, etc.), a polyamide fiber (a polyamide-6 fiber, a polyamide-66 fiber, a polyamide-46 fiber, an aramid fiber, etc.), a polyalkylene arylate-based fiber (a $C_{2-4}$ alkylene $C_{8-14}$ arylate-based fiber such as a polyethylene terephthalate (PET) fiber, a polytrimethylene terephthalate (PTT) fiber, a polybutylene terephthalate (PBT) fiber, and a polyethylene naphthalate (PEN) fiber, etc.), a vinylon fiber, a polyvinyl alcohol-based fiber, and a poly-para-phenylene benzobisoxazole (PBO) fiber; a natural fiber such as cotton, hemp, and wool; and an inorganic fiber such as a carbon fiber. Each of those staple fibers may be used alone, or two or more kinds of them may be used in combination. The staple fiber may be subjected to a bonding treatment (or surface treatment) used commonly, in the same manner as the core yarn, the sheath yarns and the cord, in order to improve dispersibility and adhesive property in the rubber composition.

Particularly when the frictional power-transmission belt (particularly the V-ribbed belt) of the present invention is used in an application where high dynamic tension is generated, it is preferable that the compression rubber layer and the tension layer include staple fibers in order to suppress the abrasion of the rubber and to improve the durability, against the high dynamic tension. Particularly it is preferable that the staple fibers protrude from the surfaces of the compression rubber layer and the tension layer (particularly the compression rubber layer). As a method for making the staple fibers protrude from the surface of the compression rubber layer, a method for burying the staple fibers into the compression rubber layer in a state where the staple fibers protrude from the surface of the compression rubber layer, a method for planting the staple fibers into the surface of the compression rubber layer, etc. may be exemplified. In the frictional power-transmission belt (particularly the V-ribbed belt) including the compression rubber layer and the tension layer (particularly the compression rubber layer) from the surfaces of which the staple fibers protrude, the abrasion resistance of the compression rubber layer can be enhanced so that the durability can be prevented from deteriorating due to abrasion of the compression rubber layer before a damage occurs due to bending fatigue or peeling.

The rubber composition may further include additives used commonly. Examples of the commonly used additives include a vulcanizing agent or a crosslinking agent (or a crosslinking agent based additive) (a sulfur-based vulcanizing agent or the like), a co-crosslinking agent (bismaleimides, etc.), a vulcanization aid or a vulcanization accelerator (a thiuram-based accelerator or the like), a vulcanization retarder, metal oxide (zinc oxide, magnesium oxide, calcium oxide, barium oxide, iron oxide, copper oxide, titanium oxide, aluminum oxide, etc.), a reinforcing agent (e.g. carbon black or silicon oxide such as water-containing silica), a filler (clay, calcium carbonate, talc, mica, etc.), a softening agent (e.g. oils such as paraffin oil and naphthenic oil), a processing agent or a processing aid (stearic acid, metal salt of stearic acid, wax, paraffin, fatty acid amide, etc.), an anti-aging agent (an antioxidant, an anti-heat aging agent, a bending-crack inhibitor, an ozone-deterioration inhibitor, etc.), a coloring agent, a tackifier, a plasticizer, a coupling agent (a silane coupling agent, etc.), a stabilizer (an ultraviolet absorber, a heat stabilizer, etc.), a flame retardant, and an antistatic agent. Each of those additives may be used alone, or two or more kinds of them may be used in combination. Incidentally, the metal oxide may act as a crosslinking agent. In addition, particularly the rubber composition forming the adhesion rubber layer 14 may contain an adhesiveness improver (resorcin-formaldehyde co-condensate, amino resin, etc.).

The rubber compositions forming the compression rubber layer 12, the adhesion rubber layer 14 and the tension layer 15 may be the same as one another or may be different from one another. In the same manner, the staple fibers contained in the compression rubber layer 12, the adhesion rubber layer 14 and the tension layer 15 may be the same as one another or may be different from one another.

(Cover Fabric)

The tension layer 15 may be formed of a cover fabric. The cover fabric can be, for example, formed of a fabric material (preferably woven fabric) such as woven fabric, wide-angle fabric, knitted fabric, and nonwoven fabric. If necessary, a bonding treatment such as a treatment with RFL liquid (such as immersion treatment) or friction for rubbing adhesion rubber into the fabric material may be performed, or the adhesion rubber and the fabric material are laminated (coated) on each other and then disposed on the compression rubber layer and/or the adhesion rubber layer in the aforementioned form.

The tension layer 15 may be a tension layer in which a surface of a rubber layer is covered with cloth (such as the cover fabric). Such a tension layer is preferably applied to an engine mounted with a belt-type ISG drive including a tensioner at the back surface of the belt. As the tension layer to be applied to the engine mounted with a belt-type ISG drive including a tensioner, a tension layer including a staple fiber or a tension layer whose surface is covered with cloth and which includes a staple fiber is also preferable as well as the tension layer whose surface is covered with cloth. When such a tension layer is applied, it is possible to improve the durability even in the belt-type ISG drive including a tensioner in which abrasion resistance is also required in the tension rubber layer.

(Method for Manufacturing Frictional Power-Transmission Belt)

A known or commonly used method can be used for manufacturing the frictional power-transmission belt of the present invention as long as the aforementioned core wire (or twisted cord) is buried in a rubber layer in place of a conventional core wire. That is, the frictional power-transmission belt can be manufactured through a step in which a rubber layer or sheet (such as a laminate or a laminated sheet including an adhesion rubber layer) formed of an unvulcanized rubber composition and having the aforementioned core wire (or twisted cord) buried therein is formed into a predetermined shape, and a step in which the formed body formed thus is vulcanized. After the vulcanizing step, the vulcanized formed body may be processed by a processing step (a processing step of cutting, rib-forming, etc.). For example, the frictional power-transmission belt may be manufactured in such a manner that the core wire (or twisted cord) is buried in the rubber layer, formed into a cylindrical shape by a forming mold, and vulcanized to form a sleeve, and the sleeve is cut into a predetermined width. For example, among frictional power-transmission belts, the V-ribbed belt can be formed in such a manner that the compression rubber layer 12, the adhesion rubber layer 14 in which the core wire (or twisted cord) 1 is buried, and the tension layer 15 are formed of unvulcanized rubber compositions respectively and laminated; the laminated body formed thus is formed into a cylindrical shape by a forming mold and vulcanized to form a sleeve; and the vulcanized sleeve is cut into a predetermined width. More in detail, the V-ribbed belt can be manufactured in the following method.

(First Manufacturing Method)

First, a sheet for a tension layer is wound around a cylindrical forming mold (mold or forming mold) having a smooth surface. A core wire (or twisted cord) forming a core body is spun spirally on the sheet. A sheet for the adhesion rubber layer and a sheet for the compression rubber layer are wound sequentially to prepare a formed body. After that, the forming mold in a state where the formed body is covered with a vulcanizing jacket is put into a vulcanizer to perform vulcanization under predetermined vulcanizing conditions. After that, the formed body is released from the forming mold to obtain a cylindrical vulcanized rubber sleeve. The external surface (compression rubber layer) of the vulcanized rubber sleeve is ground with a grinding wheel to form a plurality of ribs. The vulcanized rubber sleeve is then cut in the longitudinal direction of the belt with a predetermined width by a cutter to thereby obtain a V-ribbed belt. Incidentally, when the belt cut thus is reversed, a V-ribbed belt including a compression rubber layer having rib portions in an inner circumferential surface thereof is obtained.

(Second Manufacturing Method)

First, using a cylindrical inner mold with a flexible jacket attached to an outer circumferential surface thereof as an inner mold, a sheet for a tension layer is wound around the flexible jacket on the outer circumferential surface. A core wire (or twisted cord) for forming a core body is spun spirally on the sheet. Further, a sheet for a compression rubber layer is wound to prepare a laminate. Next, a cylindrical outer mold provided with a plurality of rib molds in an inner circumferential surface thereof is used as an outer mold which can be attached to the inner mold, and the inner mold on which the laminate is wound is disposed concentrically within the outer mold. After that, the flexible jacket is expanded toward the inner circumferential surface (rib molds) of the outer mold, and the laminate (compression rubber layer) is pressed into the rib molds and vulcanized. The inner mold is taken out from the outer mold, and a vulcanized rubber sleeve with a plurality of ribs is released from the outer mold. The vulcanized rubber sleeve is then cut in the longitudinal direction of the belt with a predetermined width by a cutter to thereby obtain a V-ribbed belt. According to the second manufacturing method, the laminate including the tension layer, the core body and the compression rubber layer can be expanded at one time to thereby obtain a sleeve (or a V-ribbed belt) having a plurality of ribs.

(Third Manufacturing Method)

As for the second manufacturing method, for example, a method disclosed in JP-A-2004-82702 (a method in which only a compression rubber layer is expanded to form a preliminary formed body (semi-vulcanized state), and next a tension layer and a core body are expanded to be pressed and attached onto the preliminary formed body so as to be vulcanized and integrated, thereby obtaining a V-ribbed belt) may be used.

EXAMPLES

The present invention will be described below more in detail based on Examples. However, the present invention is not limited to those Examples.

(Raw Materials and Composition)
(Raw Yarn for Forming Core Yarn)
- Carbon Fiber 1: "TORAYCA (registered trademark) T400HB" manufactured by Toray Industries, Inc., tensile elastic modulus 230 GPa, single yarn fineness 0.67 dtex, number of filaments 6,000, total fineness 400 tex
- Carbon Fiber 2: "TORAYCA (registered trademark) T700SC" manufactured by Toray Industries, Inc., tensile elastic modulus 230 GPa, single yarn fineness 0.67 dtex, number of filaments 12,000, total fineness 800 tex
- Carbon Fiber 3: "TORAYCA (registered trademark) T400HB" manufactured by Toray Industries, Inc., tensile elastic modulus 230 GPa, single yarn fineness 0.67 dtex, number of filaments 3,000, total fineness 200 tex (Raw Yarn for Forming Sheath Yarn)
- Glass Fiber: "MICROGLAS (registered trademark) High-Strength Glass" manufactured by Nippon Sheet Glass Co., Ltd.

(Bonding Treatment Liquid)
Aqueous mixed liquid having carboxyl-modified hydrogenated nitrile rubber latex as its main component, and containing 25 parts by mass/100 parts by mass (phr) of 4,4'-bismaleimide diphenylmethane, and 25 parts by mass/100 parts by mass (phr) of blocked polyisocyanate by solid content. The total solid content concentration was 20 mass %. Incidentally, "phr" designates parts by mass of an additive relative to 100 parts by mass of rubber in terms of solid content.

(Overcoat Treatment Liquid)
A toluene-diluted solution of adhesive agent "CHEM-LOK 233X" manufactured by Lord Corporation, having a solid content concentration of 10 mass %

(Raw Materials for Forming Belt)
- EPDM: "NORDEL (registered trademark) IP3640" manufactured by DowDuPont, Inc., Mooney viscosity 40 (100° C.)
- Carbon black HAF: "SEAST (registered trademark) 3" manufactured by Tokai Carbon Co., Ltd.
- Water-containing silica: "Nipsil (registered trademark) VN3" manufactured by Tosoh Silica Corporation, BET specific surface area 240 $m^2/g$
- Resorcin-formaldehyde condensate: "Phenacolite Resin (B-18-S) (resorcinol lower than 20 mass %, formalin lower than 0.1 mass %)" manufactured by INDSPEC Chemical Corporation
- Anti-aging agent: "NONFLEX (registered trademark) OD3" manufactured by Seiko Chemical Co., Ltd.
- Vulcanization accelerator DM: di-2-benzothiazole disulfide
- Polyamide staple fiber: "66-NYLON" manufactured by Asahi Kasei Corporation
- Paraffin-based softener: "DIANA (registered trademark) PROCESS OIL" manufactured by Idemitsu Kosan Co., Ltd.
- Organic peroxide: "PERKADOX (registered trademark) 14RP" manufactured by KAYAKU AKZO CO., LTD.
- Cotton fabric with rubber: treated fabric in which adhesive rubber described in Table 1 was rubbed into fabric (basis weight of 280 $g/m^2$) of 20-count cotton yarn plainly woven at a yarn density of 75 threads/50 mm

[Preparation of Core Wire]

Example 1

First, Carbon Fiber 1 having a total fineness of 400 tex was immersed into the bonding treatment liquid for 10 seconds, and then dried at 150° C. for 2 minutes. Thus, a core yarn was prepared.

In addition, a glass fiber having a total fineness of 33 tex was immersed into the bonding treatment liquid for 10 seconds, then dried at 150° C. for 1 minute, and further twisted (primarily-twisted) at 8 twists/10 cm in an S-direction. Thus, a sheath yarn was prepared. 16 sheath yarns were disposed around the core yarn subjected to a bonding treatment, and twisted (secondarily-twisted) together at a number of twists of 8 twists/10 cm in the S-direction. Thus, an S-twisted cord having a core-sheath structure was prepared. On the other hand, a Z-twisted cord was also prepared in the same manner as above, except that the directions of primary twisting and secondary twisting were set in a Z-direction.

Each of the S-twisted and Z-twisted cords obtained thus was immersed into an overcoat treatment liquid for 5 seconds, and dried at 100° C. for 3 minutes. Thus, treated cords (treated S-twisted cord and treated Z-twisted cord) (diameter 0.99 mm) were prepared.

Example 2

Treated cords (treated S-twisted cord and treated Z-twisted cord) (diameter 1.10 mm) were obtained in the same manner as in Example 1, except that the total fineness of the glass fiber forming the sheath yarn was set at 66 tex, and the number of sheath yarns was set at 12.

Example 3

Treated cords (treated S-twisted cord and treated Z-twisted cord) (diameter 0.78 mm) were obtained in the same manner as in Example 1, except that the carbon fiber forming the core yarn was changed to Carbon Fiber 3 (total fineness 200 tex), and the number of sheath yarns was set at 12.

Comparative Example 1

First, Carbon Fiber 1 having a total fineness of 400 tex was immersed into the bonding treatment liquid for 10 seconds, then dried at 150° C. for 2 minutes, and twisted at 8 twists/10 cm in an S-direction. Thus, a single-twisted cord was prepared.

On the other hand, a Z-direction single-twisted cord was also prepared in the same manner as above, except that the twisting direction was set in a Z-direction Each of the S-direction and Z-direction single-twisted cords obtained thus was immersed into an overcoat treatment liquid for 5 seconds, and then dried at 100° C. for 3 minutes. Thus, treated cords (diameter 0.71 mm) were prepared.

Comparative Example 2

Treated cords (diameter 1.00 mm) were obtained in the same manner as in Comparative Example 1, except that Carbon Fiber 1 was changed to Carbon Fiber 2 (total fineness 800 tex).

Comparative Example 3

Treated cords (treated S-twisted cord and treated Z-twisted cord) (diameter 0.95 mm) were obtained in the same manner as in Example 1, except that the total fineness of the glass fiber forming the sheath yarn was set at 22 tex, and the number of sheath yarns was set at 20.

Comparative Example 4

Treated cords (treated S-twisted cord and treated Z-twisted cord) (diameter 1.18 mm) were obtained in the same manner as in Example 1, except that the total fineness of the glass fiber forming the sheath yarn was set at 99 tex, and the number of sheath yarns was set at 10.

(Preparation of Belt)

First, a single ply (single layer) of cotton fabric with rubber was wound around the outer circumference of a cylindrical forming mold having a smooth surface, and an unvulcanized sheet for an adhesion rubber layer, which was formed of a rubber composition shown in Table 1, was wound around the outside of the cotton fabric. Next, two treated cords (S-twisted cord and Z-twisted cord) were spirally spun and wound on the sheet for the adhesion rubber layer, in the state where the S-twisted treated cord and the Z-twisted treated cord were arranged in parallel at a predetermined pitch shown in Table 3. Further, an unvulcanized sheet for an adhesion rubber layer which was formed of the aforementioned rubber composition and an unvulcanized sheet for a compression rubber layer which was formed of a rubber composition shown in Table 2 were wound sequentially thereon. In the state where a vulcanizing jacket was disposed outside the sheet for the compression rubber layer, the forming mold was put into a vulcanizer, and vulcanized. A cylindrical vulcanized rubber sleeve obtained by the vulcanization was released from the forming mold. The compression rubber layer of the vulcanized rubber sleeve was ground with a grinder to form a plurality of V-shaped grooves concurrently. The cylindrical vulcanized rubber sleeve was then cut circumferentially into a round slice by a cutter. Thus, a V-ribbed belt having three ribs formed therein (circumferential length 1,100 mm) was obtained. In the obtained belt, the S-twisted treated cord and the Z-twisted treated cord were arranged alternately in parallel in a sectional view in the direction shown in FIG. 2.

TABLE 1

(composition for adhesion rubber layer)

| components | parts by mass |
| --- | --- |
| EPDM | 100 |
| stearic acid | 1 |
| zinc oxide | 5 |
| carbon HAF | 35 |
| water-containing silica | 20 |
| resorcin-formaldehyde condensate | 2 |
| anti-aging agent | 2 |
| vulcanization accelerator DM | 2 |
| hexamethoxy methylol melamine | 2 |
| sulfur | 1 |
| total | 170 |

TABLE 2

(composition for compression rubber layer)

| components | parts by mass |
| --- | --- |
| EPDM | 100 |
| polyamide staple fiber | 15 |
| cotton staple fiber | 25 |
| zinc oxide | 5 |
| stearic acid | 1 |
| mercaptobenzimidazole | 1 |
| carbon HAF | 60 |
| paraffin-based softener | 10 |
| organic peroxide | 4 |
| dibenzoyl-quinone dioxime | 2 |
| total | 223 |

(Bending Fatigue Test)

Figure 3:
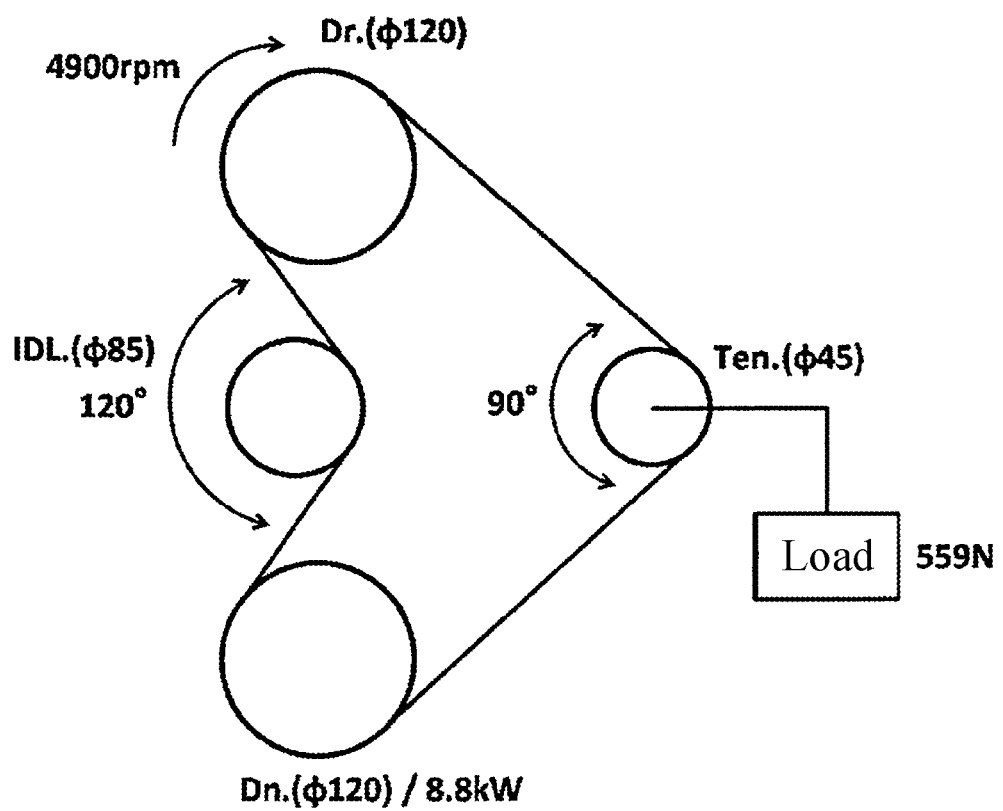
FIG. 3 is a schematic view showing a layout of a testing machine used for a bending fatigue resistance test on V-ribbed belts obtained in Examples and Comparative Examples.

Bending fatigue test was performed by using a testing machine (the layout of the testing machine is shown in FIG. 3) in which a driving pulley (Dr.) having a diameter of 120 mm, a tension pulley (Ten.) having a diameter of 45 mm, a driven pulley (Dn.) having a diameter of 120 mm, and an idler pulley (IDL.) having a diameter of 85 mm were disposed in order. The V-ribbed belt was suspended on each pulley of the testing machine, and driven to run under the following conditions. That is, the rotating speed of the driving pulley was 4,900 rpm, the belt was wound on the idler pulley at a winding angle of 120°, the belt was wound on the tension pulley at a winding angle of 90°, a load on the driven pulley was 8.8 kW, a fixed load (559 N) was given to the belt, and an atmospheric temperature was 120° C. Then the belt was made to run for 200 hours. The tensile strength of the belt was measured before and after the running. Values converted to tensile strength per one rib and a strength retention ratio are shown in Table 3. It can be determined that the bending fatigue resistance is higher as the strength retention ratio is higher.

High-Load Durability Test (Durability Running Test (Running Life))

Figure 4:
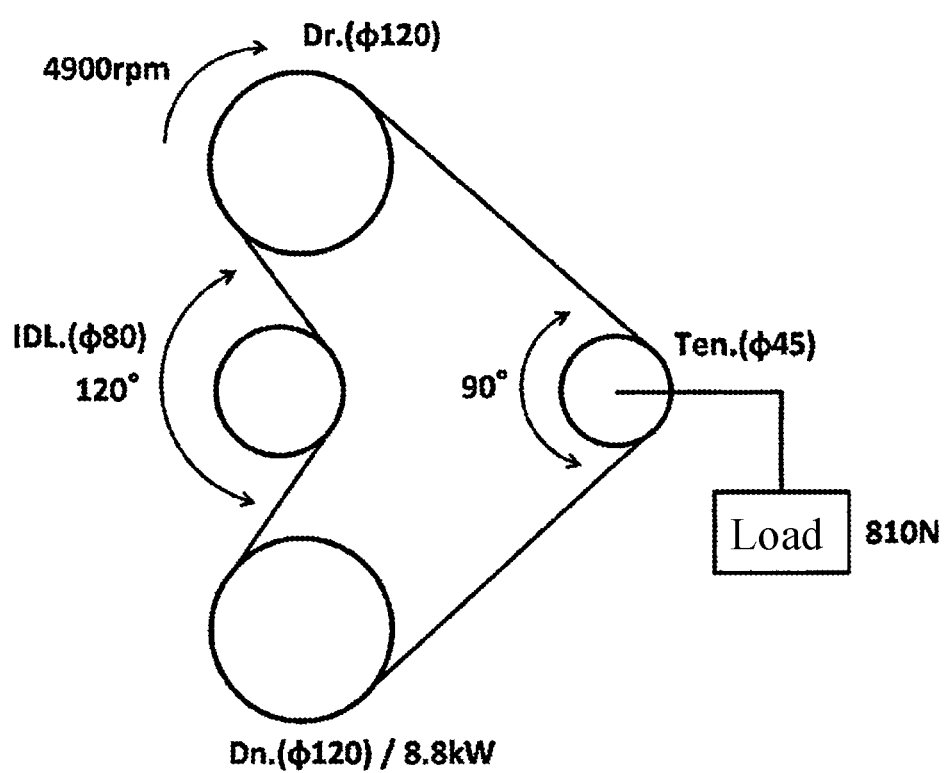
FIG. 4 is a schematic view showing a layout of a testing machine used for a durability running test on the V-ribbed belts obtained in Examples and Comparative Examples.

Durability running test was performed by using a testing machine (the layout of the testing machine is shown in FIG. 4) in which a driving pulley (Dr.) having a diameter of 120 mm, a tension pulley (Ten.) having a diameter of 45 mm, a driven pulley (Dn.) having a diameter 120 mm, and an idler pulley (IDL.) having a diameter of 80 mm were disposed in order. The V-ribbed belt was suspended on each pulley of the testing machine, and driven to run under the following conditions. That is, the rotating speed of the driving pulley was 4,900 rpm, the belt was wound on the idler pulley at a winding angle of 120°, the belt was wound on the tension pulley at a winding angle of 90°, a load on the driven pulley was 8.8 kW, a fixed load (810 N) was given to the belt, and an atmospheric temperature was 120° C. Then the belt was made to run up to 300 hours. The belt after the running was observed visually and with a microscope, and it was checked whether a defect such as peeling or pop-out was generated or not. When there was no defect in the belt, the belt was determined as no problem as to durability. When a defect was observed, the defect was written in Table 3.

(Tensile Strength)

The obtained V-ribbed belt was pulled under the condition of a pulling rate of 50 mm/min by use of a universal testing machine ("UH-200kNX" manufactured by Shimadzu Corporation) to thereby measure strength (tensile strength) at the time of breaking of the V-ribbed belt. In addition, the strength (tensile strength) at the time of breaking of the V-ribbed belt was also measured after the bending fatigue test, and the strength retention ratio was calculated.
(Tensile Elastic Modulus)

A pair of flat pulleys (diameter of 75 mm) were attached to a lower fixation portion and an upper load cell coupling portion of an autograph ("AGS-J10kN" manufactured by Shimadzu Corporation), and the V-ribbed belt was wound on the flat pulleys so that the back surface side of the V-ribbed belt abutted against the flat pulleys. Next the upper flat pulley was moved up to apply stress (about 14 N/mm) so as not to loosen the V-ribbed belt. The position of the upper flat pulley in this state was regarded as an initial position. The upper flat pulley was then moved up at a rate of 50 mm/min. Immediately after the stress on the V-ribbed belt reached 170 N/mm, the upper flat pulley was moved down and returned to the initial position. Such an up and down from the initial position was repeated again. In a stress-strain curve obtained in the second measurement, an inclination (average inclination) of a straight line in an area (85-140 N/mm) having a comparatively linear relationship was calculated as the tensile elastic modulus of the V-ribbed belt.

Evaluation results are shown in Table 3.

On the other hand, in Comparative Example 1 (a belt including a single twisted yarn of a carbon fiber), the tensile strength was in a low level, peeling occurred in the interface between the core wire and the adhesion rubber in the high-load durability test, and the durability was low. In addition, in Comparative Example 2 in which the fineness of the carbon fiber was increased in comparison with that in Comparative Example 1, the tensile strength before the bending fatigue test was high, but the strength retention ratio was low, projection (pop-out) of the core wire from the belt side face occurred in the high-load durability test, and the durability was low. Thus, both the bending fatigue resistance and the adhesive property could not be improved in the twisted yarn of the carbon fiber alone.

In Comparative Example 3 (a belt which has a core-sheath structure similar to Examples, and includes a core wire of a cord with a small fineness of sheath yarns and with a yarn diameter ratio of 0.18), the strength retention ratio was high and the bending fatigue resistance was excellent, but peeling occurred in the interface between the core wire and the adhesion rubber layer in the high-load durability test, and the adhesive property could not be improved.

TABLE 3

|  |  |  | Examples | | | | | |
|---|---|---|---|---|---|---|---|---|
|  |  |  | 1 | | 2 | | 3 | |
| core | structure | | core-sheath | | core-sheath | | core-sheath | |
| wire | fiber type | | Carbon 1 | Glass | Carbon 1 | Glass | Carbon 3 | Glass |
|  | fineness × number of yarns | | 400 tex × 1 | 33 tex × 16 | 400 tex × 1 | 66 tex × 12 | 200 tex × 1 | 33 tex × 12 |
|  | number of twists for single (number of primary twists) | twists/10 cm | — | 8 | — | 8 | — | 8 |
|  | number of twists for bundling (number of secondary twists) | twists/10 cm | 8 | | 8 | | 8 | |
|  | core wire diameter (diameter) | mm | 0.99 | | 1.10 | | 0.78 | |
|  | core yarn diameter (A) | mm | 0.61 | | 0.61 | | 0.41 | |
|  | sheath yarn diameter (B) | mm | 0.15 | | 0.21 | | 0.15 | |
|  | yarn diameter ratio (B/A) | | 0.25 | | 0.34 | | 0.37 | |
| belt | core wire pitch | mm | 1.20 | | 1.30 | | 0.95 | |
|  | tensile strength | kN/rib | 2.8 | | 3.1 | | 2.4 | |
|  | tensile strength after bending fatigue test | kN/rib | 2.1 | | 2.3 | | 2.0 | |
|  | strength retention ratio | % | 75 | | 74 | | 83 | |
|  | high-load durability test | | no problem | | no problem | | no problem | |

|  |  |  | Comparative Examples | | | | | | | |
|---|---|---|---|---|---|---|---|---|---|---|
|  |  |  | 1 | | 2 | | 3 | | 4 | |
| core | structure | | single twisted yarn | | single twisted yarn | | core-sheath | | core-sheath | |
| wire | fiber type | | Carbon 1 | | Carbon 2 | | Carbon 1 | Glass | Carbon 1 | Glass |
|  | fineness × number of yarns | | 400tex × 1 | | 800 tex × 1 | | 400 tex × 1 | 22 tex × 20 | 400 tex × 1 | 99 tex × 10 |
|  | number of twists for single (number of primary twists) | twists/10 cm | 8 | | 8 | | — | 8 | — | 8 |
|  | number of twists for bundling (number of secondary twists) | twists/10 cm | — | | — | | 8 | | 8 | |
|  | core wire diameter (diameter) | mm | 0.71 | | 1.00 | | 0.95 | | 1.18 | |
|  | core yarn diameter (A) | mm | 0.61 | | 0.90 | | 0.61 | | 0.61 | |
|  | sheath yarn diameter (B) | mm | — | | — | | 0.11 | | 0.26 | |
|  | yarn diameter ratio (B/A) | | — | | — | | 0.18 | | 0.43 | |
| belt | core wire pitch | mm | 0.90 | | 1.20 | | 1.15 | | 1.40 | |
|  | tensile strength | kN/rib | 2.5 | | 3.0 | | 2.8 | | 3.0 | |
|  | tensile strength after bending fatigue test | kN/rib | 1.5 | | 1.4 | | 2.0 | | 1.8 | |
|  | strength retention ratio | % | 60 | | 47 | | 71 | | 60 | |
|  | high-load durability test | | peeling | | pop-out | | peeling | | no problem | |

Incidentally, the tensile elastic modulus of the V-ribbed belt obtained in Example 2 was 330 N/(mm·%).

In Examples 1 to 3, the strength retention ratio was higher than that in Comparative Examples, peeling or pop-out did not occur in the high-load durability test, and the durability was high.

In Comparative Example 4 (a belt which has a core-sheath structure similar to Examples, and includes a core wire of a cord with a large fineness of yarns and with a yarn diameter ratio of 0.43), peeling or pop-out did not occur in the high-load durability test, and the adhesive property was excellent, but the strength retention ratio was low, and the bending fatigue resistance could not be improved.

In Examples 1 and 2 (the total fineness of the core yarn was 400 tex), the bending fatigue resistance and the adhesive property could be attained compatibly, and the durability was also at a level of no problem. In Example 3 (the total fineness of the core yarn was as narrow as 200 tex), the tensile strength before the bending fatigue test was slightly lower than that in any other Examples, but the bending fatigue resistance was particularly excellent, and the tensile strength after the bending fatigue test was at a level comparable to those in Examples 1 and 2. It is therefore proved that the fineness of the core yarn can be selected suitably in accordance with a required level of the bending fatigue resistance.

INDUSTRIAL APPLICABILITY

A frictional power-transmission belt (such as a V-ribbed belt) of the present invention can be, for example, used as a V-ribbed belt for use in accessory drive of an automobile engine. The V-ribbed belt can transmit power with a narrow belt width and is excellent in durability. Therefore, the V-ribbed belt can be used particularly suitably as a V-ribbed belt for driving an engine mounted with an ISG where high dynamic tension is generated.

Although the present invention has been described above in detail and with reference to its specific embodiment, it is obvious for those in the art that various modifications or changes can be made without departing from the spirit and scope of the present invention.

The present application is based on Japanese Patent Application No. 2017-235161 filed on Dec. 7, 2017, and Japanese Patent Application No. 2018-201776 filed on Oct. 26, 2018, the contents of which are incorporated herein by reference.

REFERENCE SIGNS LIST 1 core wire (or twisted cord)
2 core yarn
3 sheath yarn
12 compression rubber layer
13 V-rib portion
14 adhesion rubber layer
15 tension layer

The invention claimed is:
1. A V-ribbed belt comprising:
a compression rubber layer formed of a rubber composition containing a rubber component comprising an ethylene-α-olefin elastomer; and
a core wire, and
having a tensile elastic modulus of 240 to 500 N/(mm·%),
wherein:
the tensile elastic modulus of the V-ribbed belt is expressed as an amount of force required to stretch a belt of 1 mm width by 1% length,
the core wire comprises:
a core yarn comprising a high-elastic modulus fiber having a tensile elastic modulus of 200 to 900 GPa; and
a plurality of sheath yarns each comprising a low-elastic modulus fiber having a tensile elastic modulus of 50 to 150 GPa and disposed around the core yarn,
the plurality of sheath yarns are twisted together around the core yarn, and wherein the core wire has a ratio of an average diameter of the sheath yarns to an average diameter of the core yarn of 0.2 to 0.4,
each of the sheath yarns is twisted in a same direction as a direction in which the twisted sheath yarns are further twisted with the core yarn,
a total fineness of the core yarn is 200 to 600 tex, and the sheath yarns have the average diameter of 0.13 to 0.25 mm.

2. The V-ribbed belt according to claim 1, wherein each of sheath yarns has a total fineness of 30 to 80 tex.

3. The V-ribbed belt according to claim 1, wherein each of the sheath yarns is a twisted yarn, and
the core wire has a twisted-yarn configuration in which the core yarn and 11 to 19 of the twisted sheath yarns with respect to one core yarn are twisted together.

4. The V-ribbed belt according to claim 1, wherein the belt comprises, as the core wire, an S-twisted portion and a Z-twisted portion which are buried at a predetermined interval in a rubber layer.

5. The V-ribbed belt according to claim 1, wherein the high-elastic modulus fiber comprises a carbon fiber, and the low-elastic modulus fiber comprises a glass fiber.

6. The V-ribbed belt according to claim 1, comprising an adhesive component attached to a surface of at least a part of the high-elastic modulus fiber or a surface of at least a part of the low-elastic modulus fiber, and comprising a rubber component attached to a surface of at least a part of the core wire.

7. The V-ribbed belt according to claim 1, being attached to an engine mounted with a belt-type integrated starter generator (ISG) drive in which a dynamic tension of 85 N/mm or more acts on per 1 mm of a width of the belt.

8. The V-ribbed belt according to claim 1,
wherein a tensile strength of the V-ribbed belt is from 420 N/mm to 1,000 N/mm.

* * * * *